United States Patent

Walther

(10) Patent No.: US 6,297,673 B1
(45) Date of Patent: Oct. 2, 2001

(54) EVALUATION CIRCUIT FOR ELECTRONIC SIGNAL TRANSMITTERS

(75) Inventor: Michael Walther, Moeglingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/423,989

(22) PCT Filed: Dec. 12, 1998

(86) PCT No.: PCT/DE98/03540

§ 371 Date: Nov. 17, 1999

§ 102(e) Date: Nov. 17, 1999

(87) PCT Pub. No.: WO99/49321

PCT Pub. Date: Sep. 30, 1999

(30) Foreign Application Priority Data

Mar. 21, 1998 (DE) ............... 198 12 486

(51) Int. Cl.$^7$ ............................ H03K 3/45
(52) U.S. Cl. ......................... 327/103; 327/510
(58) Field of Search ............... 327/77, 103, 480, 327/481, 509, 510, 511

(56) References Cited

U.S. PATENT DOCUMENTS 5,218,298 * 6/1993 Vig ........................... 324/251
5,446,397 * 8/1995 Yotsuyanagi ................. 327/66
5,760,614 * 6/1998 Ooishi et al. ................ 327/77

OTHER PUBLICATIONS

"Designing with SENSFETS", by Warren Schultz, in Linear Design, PCIM Europe, Nov. 1989, pp. 242 to 248.

* cited by examiner

*Primary Examiner*—Jeffrey Zweizig
(74) *Attorney, Agent, or Firm*—Michael J. Striker

(57) ABSTRACT

The evaluation circuit has a current interface (1,1'; 11,11') for a current signal ($i_2$) from an electronic signal transducer (6,6'; 16,16'); a current-sensing FET (3,3'; 13,13') having a gate (G), a source (S), a drain (D) and a sensing output (sense), which is connected so that the current signal from the transducer passes through the source and drain; a monitoring circuit (5,5'; 15,15') for controlling the current-sensing FET in the event of a malfunction connected between the gate (G) and to the drain (D) or source (S); a current reflector circuit (4,4'; 14,14') having an input connected to the sensing output (sense) of the current-sensing FET and a resistor (2,2'; 12,12') for converting current to voltage, which is connected to an output of the current reflector circuit, so that the current signal is converted to a voltage signal tapped between the resistor and the current reflector circuit.

4 Claims, 2 Drawing Sheets

EVALUATION CIRCUIT FOR ELECTRONIC SIGNAL TRANSMITTERS

BACKGROUND OF THE INVENTION

1. Field of the Invention

The present invention relates to an evaluation circuit for electronic signal transducers with current interfaces, which includes a component for converting a signal from a transducer into a signal voltage.

2. Prior Art

An evaluation circuit of this kind is particularly used with actuators and sensors which emit a current as an output signal. An evaluation circuit of this kind is frequently used in sensors which are used to detect the speed of motor vehicle wheels for evaluation in antilock control devices. In this connection, the sensor output signal oscillates between two current values depending on the signal state. Usual values of the signal current are, for example, 10 milliamperes for a low signal level and 20 milliamperes for a high signal level.

In order to convert the signal current into a signal voltage that can be evaluated by means of comparators, for example, the current is conducted through a measuring resistor. The measuring resistor is connected in series with the sensor. As a result of the series connection, the voltage that is applied by way of the sensor is reduced by the voltage drop at the measuring resistor. Consequently, a different voltage is applied by way of the sensor depending on the signal state.

Since the measuring resistor is usually dimensioned so that the voltage drop in it is 1.5 to 3 volts, the supply voltage available for the sensor drops by 1.5 to 3 volts. This can impair the function of the sensor. A reduction of the measuring resistor could actually achieve the fact that the supply voltage available for the sensor would no longer have large fluctuations, but a smaller measuring resistor supplies only very small signals. Problems in the evaluation of the signals arise as a result of this. Furthermore, the influence of incorrect couplings and similar malfunctions increases.

Furthermore the measuring resistor must be designed for a relatively high power since the full supply voltage can be connected to it in the event of a malfunction of the sensor or an error in the wiring harness (e.g. a short circuit).

SUMMARY OF THE INVENTION

The object of the invention is to design an evaluation circuit of the type mentioned at the beginning in such a way that the voltage that is applied by way of the sensor has fewer fluctuations.

This object is attained by virtue of the features of the characterizing part of claim 1. Advantageous improvements of the invention ensue from the dependent claims.

According to the invention the evaluation circuit for an electronic signal transducer comprises

- a current interface for supplying a current signal from the electronic signal transducer;
- a current-sensing field effect transistor having a gate, a source, a drain and a sensing output, which is connected with the current interface so that a current signal from the transducer passes through the source and drain;
- monitoring circuit means for controlling the current-sensing field effect transistor in the event of erroneous operation or malfunction, which has an output terminal connected to the gate of the field effect transistor and an input terminal connected to the source or the drain of the current-sensing field effect transistor;
- a current reflector circuit having an input and an output, wherein the input of the current reflector circuit is connected to the sensing output of the current-sensing field effect transistor; and
- means for converting current to voltage, preferably a resistor, which is connected to the output of the current reflector circuit, so that the current signal is converted to a voltage signal.

The sensing output of the sensing FET correspondingly supplies the coupling factor of the sensing FET with a current that corresponds to the current flowing by way of the drain-source section. The current emitted by the sensing output of the sensing FET is converted into a voltage in the conversion element. Since this voltage is no longer connected in series with the supply voltage of the sensor, it no longer has repercussions on the sensor.

The sensing output of the sensing FET is advantageously connected to the conversion element by way of a current reflector. This results in a further decoupling of the dropping voltage at the conversion element. The circuit can be dimensioned so that the dropping voltage at the conversion element assumes an optimal value for the further signal processing.

In another embodiment of the invention, a monitoring circuit is provided whose output is connected to the gate connection of the sensing FET. In a particularly advantageous manner, an input of the monitoring circuit is connected to the drain connection of the sensing FET. In the event of a malfunction, the sensing FET can be switched off by the monitoring circuit so that a power loss no longer occurs. As a result of this, the circuit can be designed for very low powers.

By means of the invention, a negligible fluctuation of the supply voltage available for the sensor is achieved in principle so that no direct measuring resistor is used but rather a current-to-current transformation is carried out. This circumvents the problem that a large measuring resistor causes voltage problems and a small measuring resistor does not supply signals that can be evaluated and is disadvantageous with regard to incorrect couplings. A current interface is provided by means of the sensing FET.

BRIEF DESCRIPTION OF THE DRAWINGS

Other advantages of the current invention ensue from the subsequent description of a particular exemplary embodiment with reference to the drawings.

DESCRIPTION OF THE PREFERRED EMBODIMENTS

Figure 1:
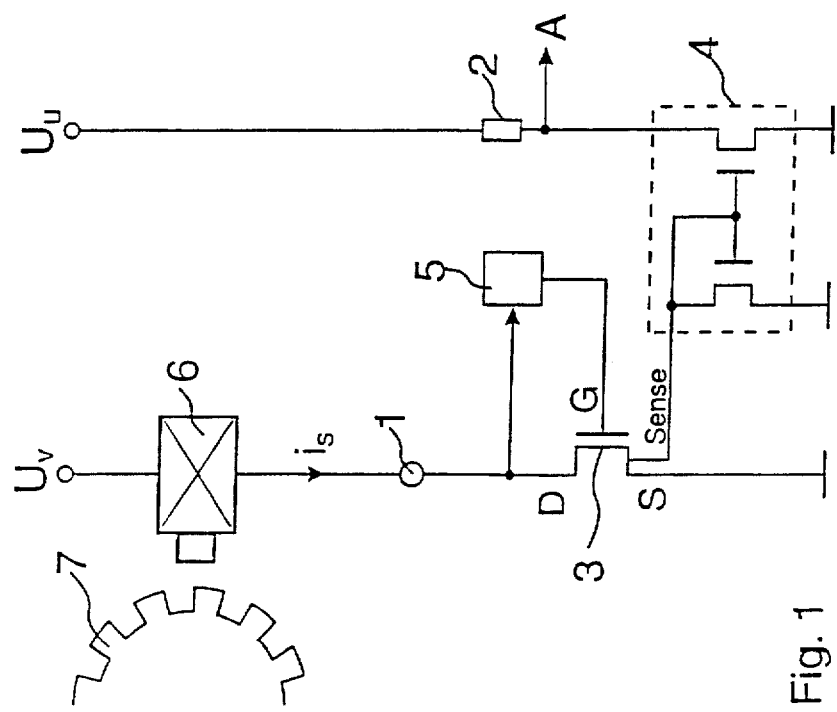
FIG. 1 is a schematic diagram of a first evaluation circuit according to the invention with a source-sensing FET.

As can be inferred from FIG. 1, an active sensor 6 is connected on the one side to a supply voltage $U_v$. On the other side, the active sensor 6 is connected to the drain connection of a current-sensing FET 3. The active sensor 6 supplies a signal current (is) of a different magnitude depending on the signal state. The current interface of the active sensor 6 is provided with the reference numeral 1.

The source connection of the sensing FET 3 is connected to ground. The drain connection of the sensing FET 3 is also connected to the input of a monitoring circuit 5. The output of the monitoring circuit 5 controls the gate connection of the sensing FET 3.

The sensing output of the sensing FET 3 is connected to the input of a conventional current reflector circuit 4. The output of current reflector circuit 4 is connected to a connection of a resistor 2. The other connection of the resistor 2 is connected to a stabilized supply voltage $U_v$. The connection of the resistor 2 connected to the current reflector 4 constitutes the output A of the evaluation circuit.

The function of the circuit will be described below. For example, if a tooth of a gear 7 passes the active sensor 6, the output current $i_s$ of the sensor 6 assumes a high-level. The output current $i_s$ can then be approximately 20 milliamperes, for example.

In the normal operating state, the sensing FET 3 is switched into a conductive state. The resistance of the drain-source section is then less than 1 ohm. The voltage drop at the sensing FET is therefore less than 20 millivolts. Consequently, approximately the full supply voltage $U_v$ is present at the sensor 6.

With a coupling factor of 1 to 100, for example, the sensing output of the sensing FET 3 emits 0.2 milliamperes. This current flows into the current reflector circuit 4. Consequently, 0.2 milliamperes also flow at the output of the current reflector circuit 4. This current flows through the resistor 2. If the magnitude of the resistance 2 is approximately 20 kiloohms, then it reduces the voltage by 4 volts. The voltage present at the output A of evaluation circuit then corresponds to magnitude of the supply voltage minus 4 volts.

If the sensor 6 is not passed by a tooth of the gear 7 but by a tooth gap, the signal current $i_s$ emitted by the sensor 6 is 10 milliamperes, for example. In accordance with the above-described function, the voltage at the output A of the evaluation circuit then corresponds to the supply voltage minus 2 volts.

If the voltage at the drain connection of the sensing FET 3 increases as a result of a malfunction and exceeds a predetermined threshold of one volt, for example, the monitoring circuit 5 sends a signal to the gate connection of the sensing FET 3 so that the sensing FET 3 is switched off. Then no more current flows through the evaluation circuit so that there is no increase in the power loss.

Figure 2:
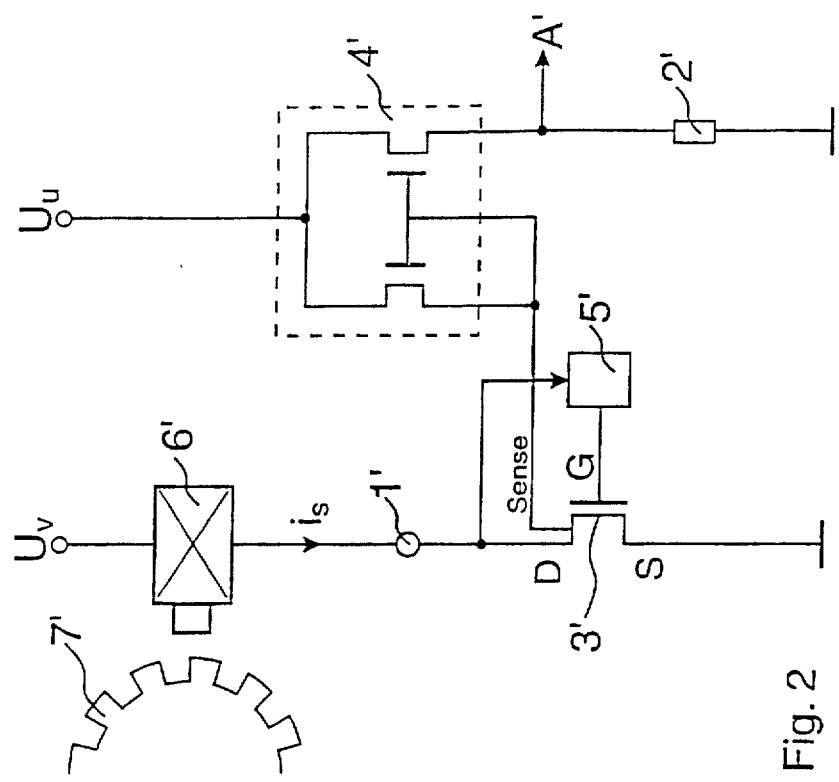
FIG. 2 is a schematic diagram of a first evaluation circuit according to the invention with a drain-sensing FET.

The evaluation circuit shown in FIG. 2 essentially corresponds to the evaluation circuit shown in FIG. 1. Instead of a source-sensing connection, the sensing FET 3', however, has a drain-sensing connection. The current reflector circuit 4' is designed differently in accordance with this fact. As a result, the resistor 2' is connected to ground instead of to the supply voltage $U_v$. Consequently, the voltage present at the output A' of the evaluation circuit does not correspond to the supply voltage minus 4 volts or the supply voltage minus 2 volts but corresponds to 4 volts or 2 volts.

Figure 4:
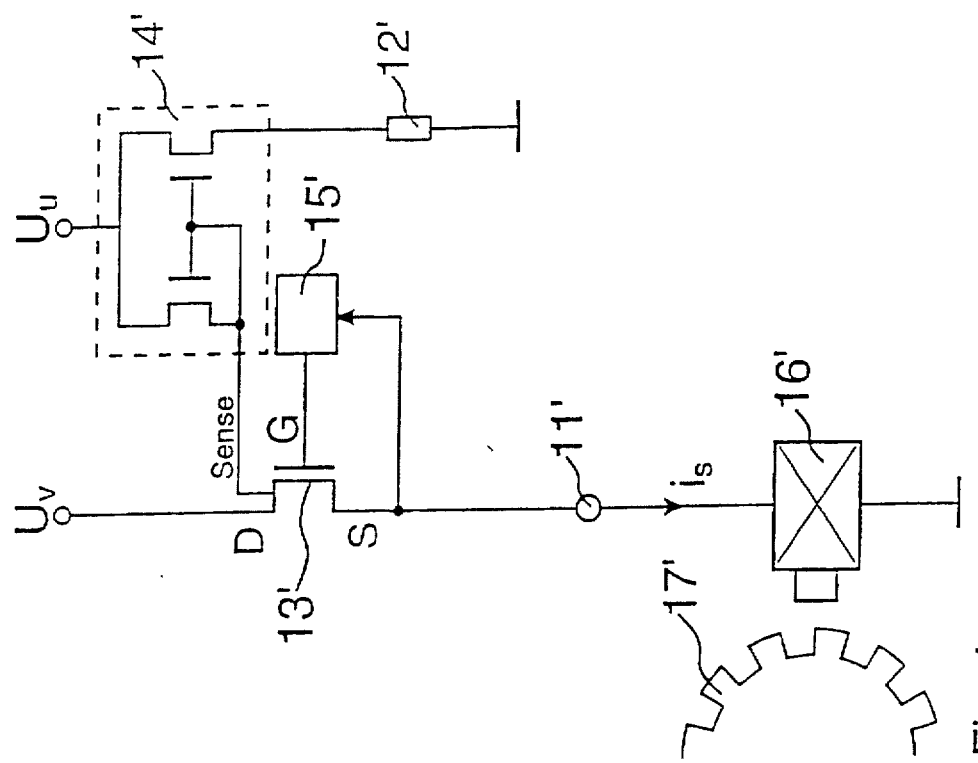
FIG. 4 is a schematic diagram of a second evaluation circuit according to the invention with a drain-sensing FET.
Figure 3:
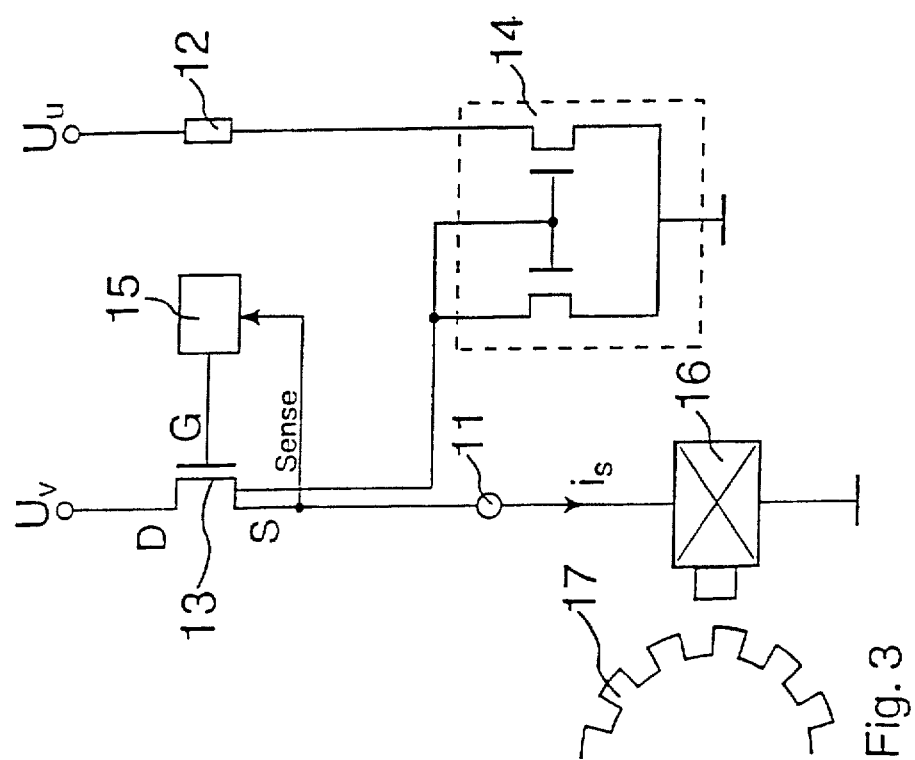
FIG. 3 is a schematic diagram of a second evaluation circuit according to the invention with a source-sensing FET.

The evaluation circuits shown in FIGS. 3 and 4 essentially correspond to the evaluation circuits shown in FIGS. 1 and 2. However, instead of being connected to the supply voltage, the sensor is connected to ground, as a result of which the relevant components of the evaluation circuit are connected to the supply voltages and corresponding polarity changes have been taken into account. However, the function of the circuits remains unchanged.

What is claimed is:

1. An evaluation circuit for an electronic signal transducer (6,6'), said evaluation circuit comprising a current interface (1;1'; 11,11') for supplying a current signal ($i_2$) from the electronic signal transducer (6,6');

a current-sensing field effect transistor (3,3'; 13,13') having a gate (G), a source (S), a drain (D) and a sensing output (sense), said current-sensing field effect transistor being connected with said current interface (1,1'; 11,11') so that said current signal ($i_2$) supplied by said transducer (6,6') passes through said source (S) and said drain (D);

monitoring circuit means (5,5'; 15,15') for controlling said current-sensing field effect transistor (3,3'; 13,13') in the event of erroneous operation or malfunction, said monitoring circuit means having an output terminal connected to said gate (G) of said current-sensing field effect transistor (3,3'; 13,13') and an input terminal connected to said drain (D) or said source (S) of said current-sensing field effect transistor (3,3'; 13,13');

a current reflector circuit (4,4'; 14,14') having an input and an output, wherein said input of said current reflector circuit is connected to said sensing output (sense) of said current-sensing field effect transistor (3,3'; 13,13'); and means (2,2') for converting current to voltage, said means for converting being connected to said output of said current reflector circuit (4,4'; 14,14'), so that said current signal ($i_2$) is converted to a voltage signal ($U_s$).

2. The evaluation circuit as defined in claim 1, wherein said means (2,2') for converting current to voltage comprises a resistor.

3. The evaluation circuit as defined in claim 1 or 2, wherein said input terminal of said monitoring circuit means (5,5') is connected to said drain (D) of said current-sensing field effect transistor between said drain (D) and said current interface (1;1').

4. The evaluation circuit as defined in claim 1 or 2, wherein said input terminal of said monitoring circuit means (15,15') is connected to said source (S) of said current-sensing field effect transistor between said source (S) and said current interface (11,11').

* * * * *